Dec. 18, 1962 R. E. HANSEN 3,069,484
GALVANIC BATTERY
Filed Feb. 10, 1960

INVENTOR.
ROBERT E. HANSEN
BY John F. Hohmann
ATTORNEY 3,069,484
GALVANIC BATTERY
Robert E. Hansen, Cleveland, Ohio, assignor to Union
Carbide Corporation, a corporation of New York
Filed Feb. 10, 1960, Ser. No. 7,923
4 Claims. (Cl. 136—3)

This invention refers to galvanic batteries and it refers more particularly to a novel construction for such batteries.

It has recently become necessary for certain applications to provide galvanic batteries which produce a high current at a reasonable voltage for a relatively short service life. This requirement has been somewhat met by using a multiplicity of anodes and cathodes of high surface area in a single battery. Further improvement in this type of construction has been provided by the use of a continuous electrolyte-wet separator which is in contact with each of the anodes and cathodes of the battery. This construction has proved very well suited to the above-noted requirements however the arrangement of parts for such construction has been cumbersome in that it has been usual to have a separate collector member for each electrode. These separate collectors were then soldered, welded, or mechanically tied together with all the anode collectors going to one terminal and all the cathode collectors going to another terminal. This resulted in a bulky battery which took up too much room for the power it delivered.

It is therefore an object of this invention to provide a battery construction which produces high current but which is not as bulky as those known to the art.

Another object of this invention is to provide such a battery which is simple to construct and easy to fabricate.

Fulfilling these objects, this invention comprises a galvanic battery having a multiplicity of electrodes with a continuous separator between each electrode and a single collector member for each group of electrodes of the same polarity.

Understanding of this invention will be facilitated by reference to the accompanying drawing in which.

More particularly, this invention includes a galvanic battery which comprises a substantially liquid-tight casing having a single anode collector and a single cathode collector embedded therein and insulated from each other thereby. Each of the collectors has a multiplicity of electrodes of the desired polarity in contact therewith and each of the electrodes is arranged in alternate relation to each other. A continuous electrolyte-wet separator material is provided between each pair of electrodes.

Figure 1:
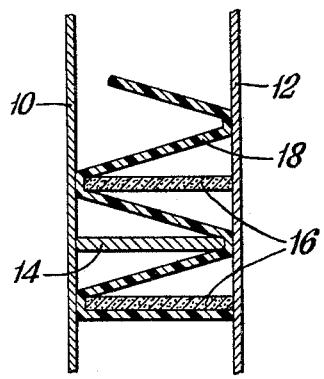
FIG. 1 is an expanded elevation in section of the working parts of this invention.
Figure 2:
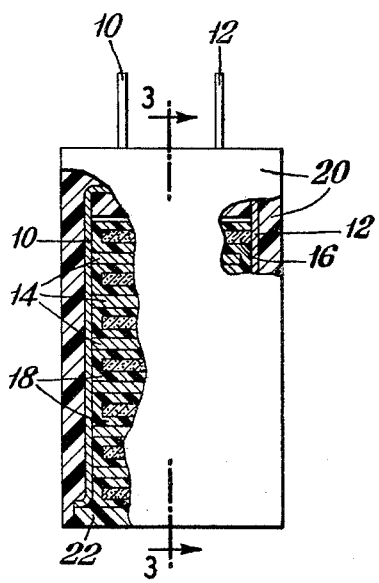
FIG. 2 is a front elevation of a battery made in accord with this invention, parts thereof being broken away.
Figure 3:
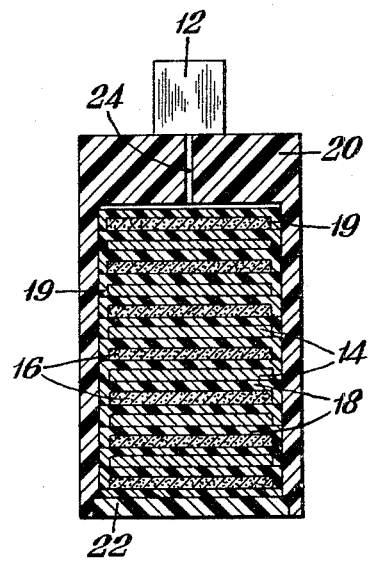
FIG. 3 is a side elevation in section of the battery shown in FIG. 2 taken along the line 3—3 looking in the direction of the arrows.

Referring now to the accompanying drawing and more particularly to FIG. 1 thereof, the basic elements of the invented galvanic battery are an anode collector 10, a cathode collector 12, an anode 14, a cathode 16, and a continuous separator 18. These elements are appropriately positioned in a substantially liquid-tight, dielectric casing 20 as shown in FIGS. 2 and 3. It is to be noted that the separator 18 is a single continuous member as shown in FIGS. 1 and 2, and that it is positioned so as to contact substantially all the surfaces of both the anode 14 and the cathode 16 which are not in contact with their respective collectors. It is desirable, as shown in FIG. 3, to provide the separator material 18 in a width greater than the width of the anode 14 or cathode 16 in order that such material may overlap the edge of each electrode as shown at 19 in FIG. 3 and insure contact therewith.

A battery according to this invention may be assembled by first forming the dielectric casing 20 having the anode collector 10 and cathode collector 12 as an integral part thereof, and inserting the remaining operating elements of the battery therein in predetermined position. If this is the method chosen, the casing 20 should be equipped with an air vent 24. In this way, the air which is displaced by the operating elements as they are inserted into the casing 20 has a means of escape through the vent 24. When these elements are in place, the vent 24 is suitably closed and a cap 22 is inserted to completely seal the battery from external contact except for the terminals of the anode collector 10 and the cathode collector 12. The overlapping separator material serves an additional function in this method of assembly in that it protects the electrodes 14 and 16 from in any way contacting the casing 20 and prevents any of the electrode material from rubbing or scraping off onto the internal casing wall. This is important since any electrode material which is deposited on the internal walls of the casing could possibly lead to short circuiting between electrodes of the battery. Channels may be provided in the corners of the casing 20 in order to allow space for the folded edges of the separator.

This method of assembly is the preferred form of the invention since there is no misalignment problem to be coped with and since this method is well adapted to assembly line technique in that the casing 20 with collectors 10 and 12 may be premolded and the electrodes pre-assembled. The complete battery may then be assembled with a minimum of effort in a short time. Modifications of this preferred assemly method will occur to those skilled in the battery art, for example; the electrodes, separator and collectors may be appropriately positioned and the dielectric casing molded therearound; or the electrodes and separator may be assembled in the casing and the collectors inserted later. These and other similar modifications are intended to be encompassed hereby.

The construction disclosed herein is adapted to use with practically any galvanic system, such as for example zinc/zinc chloride-ammonium chloride/manganese dioxide, silver oxide/potassium hydroxide/zinc, or mercuric oxide/sodium hydroxide/zinc. These systems are exemplary only, it being well within the scope of knowledge of those skilled in the battery art to determine the particular galvanic system to use for any given application. The collectors may be of the flat strip type or they may be wires, rods, tubes, screens or variations thereof without departing from this invention.

The following may be cited as a specific example of the practice of this invention. A battery utilizing the silver oxide/potassium hydroxide/zinc system was constructed in accord with the teachings of this invention. The anode collector was copper and the cathode collector was steel. Each was a 5/8 inch wide strip by one inch long. Each collector was molded into an opposite side of an epoxy resin casing on the inside thereof. The battery contained 9 cathodes each 5/8 inch by 5/8 inch by 0.04 inch and 8 anodes each 5/8 inch by 5/8 inch by 0.022 inch. The separator was a length of felted acrylic fiber 0.005 inch thick, 3/4 inch wide, and approx. 14 inches long. The anodes, cathodes and separator were inserted into the cavity of the epoxy resin casing with anodes and cathodes alternatively spaced and connected to their respective collector members and the separator interspersed between each electrode. A cap was then cemented into place to completely enclose the battery elements except for that portion of each collector which extended therefrom. The final dimensions of the battery were ⅞ inch square by 1⅜ inches long.

Another battery of the same type was made which was a ⅞ inch cube. The anode collector and the cathode collector were each round 0.064 inch diameter wire. The anode collector was copper and the cathode collector was iron. The battery contained 4 cathodes, each ⅝ inch square by 0.034 inch thick of one gram of cathodic mix embedded in a nickel grid. The battery contained 3 anodes, each ⅝ inch square by 0.05 inch thick of two contacting pieces of amalgamated flame sprayed zinc on a gauze matrix and impregnated with 9 N potassium hydroxide-carboxymethylcellulose mixture. The separator was alkaline-resistant cellulose 0.007 inch thick and ¾ inch wide. During the assembly of a typical battery of the invention such as those just described, the separator becomes wetted by the impregnated anodes.

Batteries made according to the teachings of this invention have proved very useful in that they deliver very high current at a good voltage. This exceptionally high output is particularly useful because it is delivered by a very small package. One battery of the silver oxide/potassium hydroxide/zinc system having total anode area of 6.2 square inches and a total cathode area of 6.2 square inches delivered an open circuit voltage of 1.58 volts and a flash current of 23.5 amperes. Another battery of the same system having a total anode area of 2.3 square inches and a total cathode area of 2.3 inches delivered 1.25 volts at 1.25 amperes through a 1 ohm resistor.

What is claimed is:

1. A galvanic battery comprising a dielectric casing having an interior cavity; a substantially straight anode collector positioned in said casing and having an external lead portion extending through said casing, said anode collector being embedded within a side wall of said casing and having a portion thereof exposed to said cavity; a plurality of anodes in said cavity in contact with said anode collector; a substantially straight cathode collector positioned in said casing and having an external lead portion extending through said casing, said cathode collector being embedded within an opposite side wall of said casing and having a portion thereof exposed to said cavity; a plurality of cathodes in said cavity in contact with said cathode collector; said anodes and said cathodes being arranged in said cavity in substantially alternating spaced relation to each other; and a continuous separator interposed between and in contact with all of said anodes and said cathodes; said separator being wider than said anodes and said cathodes whereby the edges of said separator overlap the edges of said anodes and said cathodes, all of the battery components being arranged and disposed within said cavity of said casing so as to completely occupy all of said cavity.

2. The galvanic battery of claim 1 wherein the corners of said casing are grooved to allow for the folded edges of said separator.

3. The galvanic battery of claim 2 wherein said collectors are flat conductive strips.

4. The galvanic battery of claim 3 wherein said anodes are impregnated with a 9 N potassium hydroxide-carboxymethylcellulose mixture.

References Cited in the file of this patent

UNITED STATES PATENTS

| | | |
|---|---|---|
| 1,855,677 | Huntley | Apr. 26, 1932 |
| 2,176,173 | Fuller et al. | Oct. 17, 1939 |
| 2,851,509 | Pasquale et al. | Sept. 9, 1958 |
| 2,851,511 | Bikerman | Sept. 9, 1958 |
| 2,851,512 | Andre | Sept. 9, 1958 |
| 2,880,259 | Nowotny | Mar. 31, 1959 |